United States Patent
Tikka

(10) Patent No.: US 10,072,037 B2
(45) Date of Patent: Sep. 11, 2018

(54) METHOD FOR PRODUCING HIGH PURITY LIGNIN

(71) Applicant: Valmet AB, Sundsvall (SE)

(72) Inventor: Panu Tikka, Esbo (FI)

(73) Assignee: VALMET AB, Sundsvall (SE)

(*) Notice: Subject to any disclaimer, the term of this patent is extended or adjusted under 35 U.S.C. 154(b) by 0 days.

(21) Appl. No.: 15/648,661

(22) Filed: Jul. 13, 2017

(65) Prior Publication Data

US 2017/0355723 A1    Dec. 14, 2017

Related U.S. Application Data

(63) Continuation-in-part of application No. 14/761,525, filed as application No. PCT/SE2013/050051 on Jan. 24, 2013.

(51) Int. Cl.
*D21C 11/00*    (2006.01)
*C07G 1/00*    (2011.01)

(52) U.S. Cl.
CPC ............ *C07G 1/00* (2013.01); *D21C 11/0007* (2013.01)

(58) Field of Classification Search
CPC ................................................. D21C 11/0007
See application file for complete search history.

(56) References Cited

U.S. PATENT DOCUMENTS

| 3,817,974 A * | 6/1974 | Sirianni | C08H 6/00 524/575 |
| 4,946,946 A * | 8/1990 | Fields | C08H 6/00 530/500 |
| 2008/0047674 A1* | 2/2008 | Ohman | D21C 11/0007 162/16 |
| 2008/0051566 A1* | 2/2008 | Ohman | D21C 11/0007 530/500 |
| 2008/0121356 A1* | 5/2008 | Griffith | D21C 11/0085 162/16 |
| 2008/0214796 A1* | 9/2008 | Tomani | C07G 1/00 530/500 |

(Continued)

FOREIGN PATENT DOCUMENTS

WO    20110037967    3/2011

*Primary Examiner* — Liam J Heincer
(74) *Attorney, Agent, or Firm* — Fasth Law Offices; Rolf Fasth

(57) ABSTRACT

The method is for separation of lignin from original black liquor ($BL_{IN}$) that has a first precipitation stage (PR) for precipitation of lignin by a first acidification using acidifier $AC_1$, preferably using $CO_2$, at alkaline conditions, then separating a lignin cake with subsequent suspension of the lignin cake in a strong acid in order to leach our metals from the lignin followed by dewatering and obtaining a clean lignin product LP. The process further is improved by intensified hydrolysis of lignin cake such that most of the carbohydrates are broken down to dissolvable monomers that could be separated from the lignin in the filtrate from a filtering stage subsequent to the hydrolysis. The improved hydrolysis could reduce as much as 90% of the carbohydrate content using a moderately increased temperature and increased charge of acidifier while avoiding any larger lignin yield losses.

5 Claims, 10 Drawing Sheets

(56) References Cited

U.S. PATENT DOCUMENTS

| | | | | |
|---|---|---|---|---|
| 2010/0041879 A1* | 2/2010 | Stigsson | ................. | C07G 1/00 536/127 |
| 2010/0325947 A1* | 12/2010 | Ohman | ................... | C08H 8/00 44/606 |
| 2011/0192560 A1* | 8/2011 | Heikkila | ............... | C13B 20/148 162/29 |
| 2011/0294991 A1* | 12/2011 | Lake | ........................ | C07G 1/00 530/500 |
| 2011/0297340 A1* | 12/2011 | Kouisni | ............ | D21C 11/0007 162/16 |
| 2012/0196233 A1* | 8/2012 | Ni | ........................... | C13K 1/02 431/2 |
| 2013/0131326 A1* | 5/2013 | Hannus | ............. | D21C 11/0007 530/500 |
| 2013/0203972 A1* | 8/2013 | Miettinen | ............... | C07G 1/00 530/500 |
| 2013/0331555 A1* | 12/2013 | Malkki | ................... | C07G 1/00 530/502 |
| 2014/0065682 A1* | 3/2014 | Retsina | ................... | C13K 1/02 435/160 |
| 2014/0339455 A1* | 11/2014 | Miettinen | ............... | C08H 6/00 252/1 |
| 2015/0233057 A1* | 8/2015 | Tunc | ...................... | D21H 11/12 162/16 |
| 2015/0322104 A1* | 11/2015 | Tikka | ....................... | C07G 1/00 530/500 |

\* cited by examiner

| Lignin from black liquor: | | BL3 | BL3 | BL2 |
|---|---|---|---|---|
| Klason lignin | %-w* | 71.5 | 71.5 | 75.0 |
| Acid soluble lignin | %-w* | 13.5 | 16.4 | 14.4 |
| Carbohydrates | %-w* | 11.2 | 10.1 | 10.8 |
| Extractives | %-w* | 0.97 | | |
| Relative composition of carbohydrates: | | | | |
| Arabinose | %** | 2.4 | 3.4 | 3.0 |
| Galactose | %** | 2.8 | 3.1 | 2.9 |
| Glucose | %** | 9.2 | 6.9 | 7.8 |
| Xylose | %** | 85.5 | 86.5 | 86.1 |
| Mannose | %** | 0.1 | 0.1 | 0.1 |

\* %-w of DS

\*\* %-w of total carbohydrate content

Fig. 3
*Prior Art*

| Expt No. | Experimental conditions | | | Carboh. Analysis Results (Labtium) | | | | | | | | | |
|---|---|---|---|---|---|---|---|---|---|---|---|---|---|
| | H2SO4 %-w in solution | Time min | Temp °C | Ara Analy. g/100g | Gal Analy. g/100g | Glu Analy. g/100g | Xyl Analy. g/100g | Man Analy. g/100g | TOTAL SUGARS analyzed g/100g | anhydr.* g/100g |
| Starting material | - | - | - | 0.2 | 0.4 | 0.8 | 7.5 | 0.1 | 9.0 | 7.9 |
| 2 | 1.0 | 60 | 120 | <0.1 | <0.1 | 0.5 | 0.2 | <0.2 | 0.7 | 0.6 |
| 3 | 1.0 | 60 | 100 | <0.1 | <0.1 | 0.5 | 0.4 | <0.2 | 0.9 | 0.7 |
| 4 | 1.0 | 60 | 80 | 0.1 | 0.2 | 0.2 | 5.8 | <0.2 | 6.3 | 5.7 |
| 11 | 1.0 | 30 | 120 | <0.1 | <0.1 | 0.1 | 0.4 | <0.2 | 0.5 | 0.5 |
| 12 | 1.0 | 10 | 120 | <0.1 | <0.1 | 0.1 | 0.3 | <0.2 | 0.4 | 0.4 |
| 21 | 1.0 | 10 | 100 | 0.1 | 0.2 | 0.2 | 5.7 | <0.2 | 6.3 | 5.6 |
| 22 | 1.0 | 10 | 80 | 0.2 | 0.3 | 0.5 | 7.4 | <0.2 | 8.4 | 7.4 |
| 31 | 1.0 | 30 | 120 | <0.1 | <0.1 | <0.1 | 0.2 | <0.2 | 0.2 | 0.2 |
| 32 | 1.0 | 30 | 100 | <0.1 | 0.1 | 0.2 | 2.7 | <0.2 | 3.0 | 2.6 |
| 33 | 1.0 | 30 | 80 | 0.1 | 0.2 | 0.4 | 6.7 | <0.2 | 7.4 | 6.6 |

* Conversion factors used: 0.90 for hexoses; 0.88 for pentoses

Fig. 8

METHOD FOR PRODUCING HIGH PURITY LIGNIN

PRIOR APPLICATIONS

This is a continuation-in-part patent application that claims priority from U.S. national phase patent application Ser. No. 14/761,525, filed 16 Jul., 2015, that claims priority from International Patent Application No. PCT/SE2013/050051, on 24 Jan. 2013.

TECHNICAL FIELD

This invention relates to a method for producing high purity lignin, wherein lignin is separated from spent cooking liquor, called original black liquor, using a precipitation process.

BACKGROUND

The advantages with lignin separation from black liquor is already described in WO 2006/031175 and WO2006/038863. These patents disclose the novel process Ligno-Boost™ that is now sold by Metso, and wherein WO 2006/031175 disclose the basic two stage acidic wash process and WO2006/038863 disclose an improvement of the process where sulphate or sulphate ions are added to the process.

The LignoBoost™ process was originally developed for production of an alternative bio-fuel, where main focus was at reduction of residual metal content, especially sodium, as the residual metal content may corrode boiler or burners using the lignin fuel. In this objective to reduce residual metal content it was shown that it was very important to maintain the process at the acidic side, and leaching and washing of lignin was kept at pH between 2-3 avoiding redeposition of metals, especially sodium, on the lignin.

An important aspect of the process is that the required charge of chemicals/acidifiers for the acidification and leaching of metals and subsequent washing may be high. If this is the case the cost of fresh chemicals is a large part of the operational cost and the commercial viability of the process is lower.

These problems could be reduced, if the process is optimized for minimum requirement for charges of fresh chemicals or acidifiers, keeping operational costs down and thus making the lignin product commercially sound.

Another consideration is to minimize the acidic waste flows from the process as conventional recovery of spent chemicals may be impeded if volumes of acidic waste flows increase in relation to the alkaline bulk volume of black liquor being recovered. Most often must acidic waste flows be handled separately if volumes are excessive which increase investments costs in recovery systems as well as operational costs of the mill.

Acidifiers in form of mill generated waste flows is thus preferable as it may both solve a waste disposal problem and lessen environmental impact as well as such usage would decrease costs for new chemicals. As the precipitation of lignin requires acidification of alkaline black liquor flows, much of the total amount of acidifier is used to decrease the pH level down to the point of where lignin starts to precipitate. The first stage reaching this pH level typically reduce the pH level from about pH 13 in the original black liquor down to a pH level about 9.5-11.5.

The LignoBoost™ process produce a lignin product which if used as fuel is classified as a "green" fuel as being based upon recovered fuel. The idea with classification of "green" fuels is based upon the concept not to increase the carbon dioxide footprint, i.e. the emissions, by burning fossil fuels. The most promising acids for this process is carbon dioxide for at least initial precipitation of the lignin, and then using sulfuric acid ($H_2SO_4$) for washing and leaching out metals from the lignin. The sulfuric acid could be added as a fresh sulfuric acid from a chemical supplier, or as preferred using so called "spent acid" from a chlorine dioxide generator often used at a pulp mill. The latter usage of this spent acid already at hand in most mill sites further emphasize that the lignin product is considered as a "green" fuel. However, interest in lignin as a base product for further usage has caught interest and in some applications further requirements on the lignin product is emphasized.

In U.S. Pat. No. 4,891,070 is disclosed a method for producing an improved aqueous printable ink composition from lignin. In this process extracting the lignin from the black liquor it is essential that the pH is not allowed to drop below pH 5 and adding an organic amine forming a lignin amine salt solution. In U.S. Pat. No. 4,891,070 is also disclosed other various methods of recovery, purification, and modification of lignin by-products as disclosed in U.S. Pat. Nos. 2,525,433; 2,680,113; 2,690,973; 3,094,515; 3,158,520; 3,503,762; 3,726,850; 3,769,272; 3,841,887; 4,001,202; 4,131,564; 4,184,845; 4,308,203; and 4,355,996 and concludes that generally the processes for obtaining purified lignin, includes pH decrease of black liquor to about 9,5 with subsequent acidification of the precipitate to a pH of about 1.5 to 4, followed by water washing to displace inorganic salts and impurities therein. However, no indication of hydrolysis of carbohydrates is shown. Thus, it could be concluded that extensive research work has been invested over several decades in finding the best process for obtaining a purified lignin product.

The original LignoBoost™ bio-fuel product produced a fuel with low residual levels of sodium and as it was used as a fuel no attention was drawn to the fact that the lignin fuel often had high levels of hemicelluloses, i.e. carbohydrates, as also hemicelluloses contributed to heat value of the fuel, even if the specific heat value of hemicelluloses is lower than pure lignin.

As the LignoBoost™ use black liquor from kraft pulping processes the hemicellulose content may vary considerably, and from worse case scenarios using cooking techniques like Lo-Solids Cooking could as much as 8-10% of the final lignin product correspond to hemicellulose/carbohydrate content.

Now is lignin considered also for usage in production of spun fibers, used when producing light weight construction details in automobiles and airplanes. But in this process the lignin purity must be higher and residual levels of hemicelluloses must be very low, well below 1 wt-%. In other applications are lignin also considered for production of chemicals and in these processes is higher lignin purity also a requirement.

It is known from handbooks in pulping processes that hemicelluloses could be removed from biomass in acidic prehydrolysis, which often was conducted at rather high temperatures. Prehydrolyse stages in pulping are typically conducted on the wood material at rather high temperatures, i.e. at about 170° C. in auto- or water hydrolysis and some 120-140° C. when wood material is slurried in dilute acid, all depending upon the established pH level (higher pH required higher temperature). In some applications have also prehydrolysis of wood chips been performed in strong acidic solutions (20-30% HCL at 40° C.), but this process led to extensive lignin destruction as well as alpha cellulose losses. Thus, if hemicellulose is to be removed selectively has always diluted acids been used. The dissolved hemicelluloses may also be further degraded at acidic conditions.

However, lignin is also known to decompose to solvable lignin if subjected to heat treatment at about 190° C. or higher, so the problem to reduce hemicelluloses content in a lignin product is not that obvious while maintaining the lignin yield high as well as reducing consumption of acidifiers and keeping acidic waste flows low. A major concern when using the LignoBoost™ process has been the filterability of the lignin throughout the process, and heating of lignin is well known to cause softening of the lignin and that negatively affects filterability. So, solving the problem with carbohydrates in lignin is not that obvious as lignin yield should be kept high while carbohydrate content should be kept low.

SUMMARY OF THE INVENTION

The invention is based upon the surprising finding that an extensive hydrolysis of the lignin cake in the LignoBoost™ process could reduce the carbohydrate content in the lignin product considerably without any major losses in lignin produced. The major part of the non-soluble carbohydrate oligomeres are broken down to dissolvable monomers that easily could be separated from the lignin in the filtrate from a filtering stage subsequent to the hydrolysis.

Further, by implementing the hydrolysis in the reslurrying of the lignin cake filtered from the original black liquor flow could the liquid volumes needing heating be reduced considerably compared to implementing a hydrolysis of the original black liquor flow.

Thus, the invention is related to a method for separation of lignin from original black liquor ($BL_{IN}$) having a first alkaline pH value, comprising the following stages in sequence:
  a first precipitation stage (PR) wherein an acidifier charge is added to the original black liquor in order to decrease the pH value of the original black liquor to a second pH level initiating precipitation of lignin whereby said second pH level is above pH 7 and below 11.5,
  followed by a first separation stage ($FP_1$) wherein the precipitated lignin is separated as a lignin cake ($LIG_1$) with a content of carbohydrates from the remaining liquid phase of the acidified original black liquor still kept in the pH range from neutral to alkaline,
  characterized in that
  lignin from the lignin cake with a content of carbohydrates is mixed in a subsequent stage with a second acidifier added to the lignin cake forming an acidic slurry establishing a pH value in the range 1-3,
  establishing a reaction temperature in the range 100-140° C. in the acidic slurry,
  maintaining the acidic slurry at the reaction temperature for a reaction time period during which at least 60% of the carbohydrates content is hydrolysed, said reaction time period resulting in a P-factor less than 20,
  followed by a second separation stage in which the treated lignin content is separated from the acidic slurry and the carbohydrates dissolved in the acidic slurry forming a low carbohydrate lignin cake.

By this establishment of this low pH level in the reslurried lignin cake as well as establishment of a rather modest temperature in this range for a period of time such that 60% of the carbohydrates content is hydrolysed, i.e. the non-soluble oligomeres broken down to soluble monomers, could the lignin product reduce carbohydrate content with low loss of lignin and at less heating requirements.

According to a preferred embodiment of the inventive method is the reaction temperature in the in the acidic slurry in the range of 100-120° C. and that the reaction time period during which at least 60% of the carbohydrates content is hydrolyzed is in the range 10-60 minutes in inverse proportion to temperature, keeping the amount of lignin dissolved from the lignin cake below 15%.

By these method steps could the yield losses of lignin be reduced, and as shown in laboratory tests be kept at about 8%.

According to another embodiment of the invention is also a cooling effect introduced such that after the acidic slurry has been kept at the reaction temperature for a reaction time period during which at least 60% of the carbohydrates content is hydrolyzed, said acid slurry is subjected to cooling before subsequent separation of the treated lignin content. By this cooling effect directly after the hydrolysis could further lignin degradation be reduced, keeping the lignin yield high.

Further according to a preferred embodiment, if the cooling effect is implemented such that the acidic slurry is cooled in an indirect heat exchanger against an acidifier to be used as the second acidifier, thereby reducing the temperature of the acidic slurry by at least 40° C. The heat economy of the process will this be improved as the heat value from the hydrolysis liquid is transferred to the acidifier used for hydrolysis.

According to an alternative or complementary embodiment of the invention are reaction conditions established such that the acidic slurry has been kept at the reaction temperature for a reaction time period during which at least 60% of the carbohydrates content is hydrolyzed, said reaction temperature and time period corresponding to a P-factor not exceeding the P-factor established at a reaction temperature of 120° C. and a time period of 60 minutes, i.e. a P-factor below 8.

Further in yet better mode in reaction conditions established such that the acidic slurry has been kept at the reaction temperature for a reaction time period during which at least 90% of the carbohydrates content is hydrolyzed, said reaction temperature and time period corresponding to a P-factor equivalent to or exceeding the P-factor established at a reaction temperature of 100° C. and a time period of 60 minutes, i.e. a P-factor above 1.

According to yet another embodiment of the invention is the lignin cake subjected to an additional acidification to a pH of at least 2-4 or lower followed by a third separation of a third lignin cake as an additional treatment stage for leaching metals from said lignin cake, said additional treatment made either before or after obtaining the low carbohydrate lignin cake. By this embodiment could residual mono-saccharide's be leached out from the lignin cake as well as residual metal content, as the acidic conditions in the leaching water is maintained avoiding re-deposition of metals and/or monomers. Preferably is also the lignin cake washed with washing water at a pH of at least 2-4 or lower after at least one of the separation stages.

It is intended throughout the present description that the expression "separation stage" embraces any means of separation. Preferably the separation is performed by using centrifugation, a filter press apparatus, a band filter, a rotary filter, such as a drum filter, or a sedimentation tank, or similar equipment, most preferred a filter press apparatus is used.

It is intended throughout the present description that the expression "original black liquor" embraces spent cooking liquor from a digester, having most of the lignin from the original cellulose material dissolved in the "original black liquor". The "original black liquor" may also have a large content of organic and inorganic material, but may also have passed through separation processes for extracting turpentine or other specific constituents, while keeping the bulk volume of dissolved lignin unaltered.

In following description is the P-factor used, and corresponds to the recorded temperature/time data using an activation energy of 125.6 kJ/mol for the xylan removal (see Sixta, H. "Multistage kraft pulping" 2006, Handbook of Pulp, Wiley-VCH, Weinheim, pp. 325-365) during auto hydrolysis. The actual P-factor for different temperatures and retention time could be seen in below table.

P-Factor $$P\text{-factor}=(e^{\wedge}(40.48-15106/(273.15+temp)))*time/60$$

Acc to Herbert Sixta Handbook of pulp, page 344

| Time | Temperature ° C. | | | | | | |
|---|---|---|---|---|---|---|---|
| Min | 80 | 100 | 120 | 140 | 150 | 160 | 170 |
| 30  | 0 | 0 | 4  | 25  | 60  | 136  | 299  |
| 45  | 0 | 1 | 6  | 38  | 89  | 204  | 448  |
| 60  | 0 | 1 | 8  | 50  | 119 | 272  | 597  |
| 75  | 0 | 1 | 10 | 63  | 149 | 340  | 746  |
| 90  | 0 | 1 | 12 | 75  | 179 | 408  | 896  |
| 105 | 0 | 2 | 14 | 88  | 209 | 476  | 1045 |
| 120 | 0 | 2 | 16 | 100 | 238 | 544  | 1194 |
| 135 | 0 | 2 | 18 | 113 | 268 | 612  | 1344 |
| 150 | 0 | 2 | 20 | 126 | 298 | 680  | 1493 |
| 165 | 0 | 3 | 22 | 138 | 328 | 748  | 1642 |
| 180 | 0 | 3 | 23 | 151 | 358 | 816  | 1792 |
| 195 | 0 | 3 | 25 | 163 | 388 | 884  | 1941 |
| 210 | 0 | 3 | 27 | 176 | 417 | 951  | 2090 |
| 225 | 0 | 4 | 29 | 188 | 447 | 1019 | 2239 |
| 240 | 0 | 4 | 31 | 201 | 477 | 1087 | 2389 |
| 255 | 0 | 4 | 33 | 214 | 507 | 1155 | 2538 |
| 270 | 0 | 4 | 35 | 226 | 537 | 1223 | 2687 |
| 285 | 0 | 5 | 37 | 239 | 566 | 1291 | 2837 |
| 300 | 1 | 5 | 39 | 251 | 596 | 1359 | 2986 |

According to the invention it has been surprisingly found that a successful removal of carbohydrates at low lignin yield losses has been obtained by implementing a hydrolysis at moderate conditions, corresponding to a P-factor well below 20, and preferably in the P-factor range 1-10.

SHORT DESCRIPTION OF THE FIGURES

FIG. 3 shows content of the separated lignin using a process shown in FIG. 1;

FIG. 8 shows the the content of the lignin material before and after using the inventive method at different hydrolysis conditions;

DETAILED DESCRIPTION OF THE INVENTION

Figure 1:
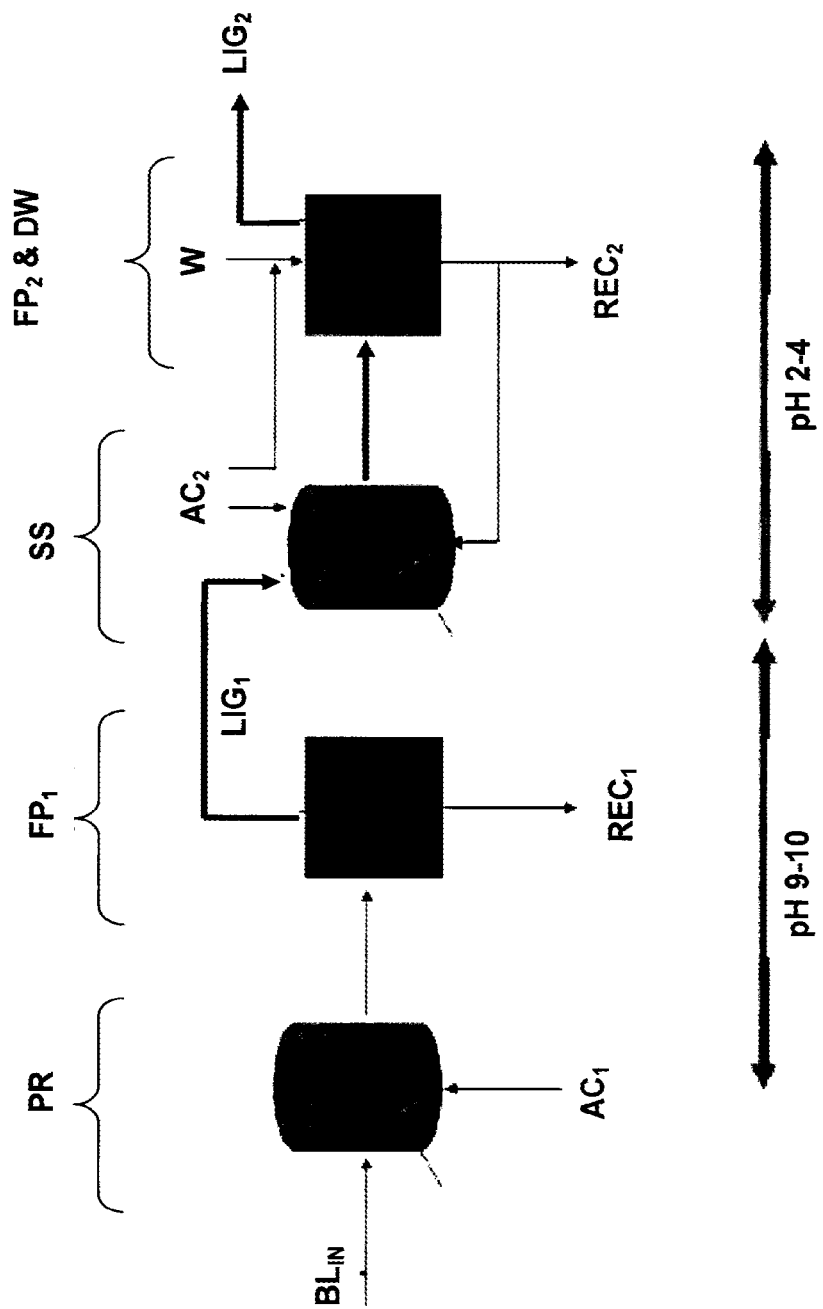
FIG. 1 shows the basic steps in prior art lignin separation process according to WO 2006/031175.
Figure 2:
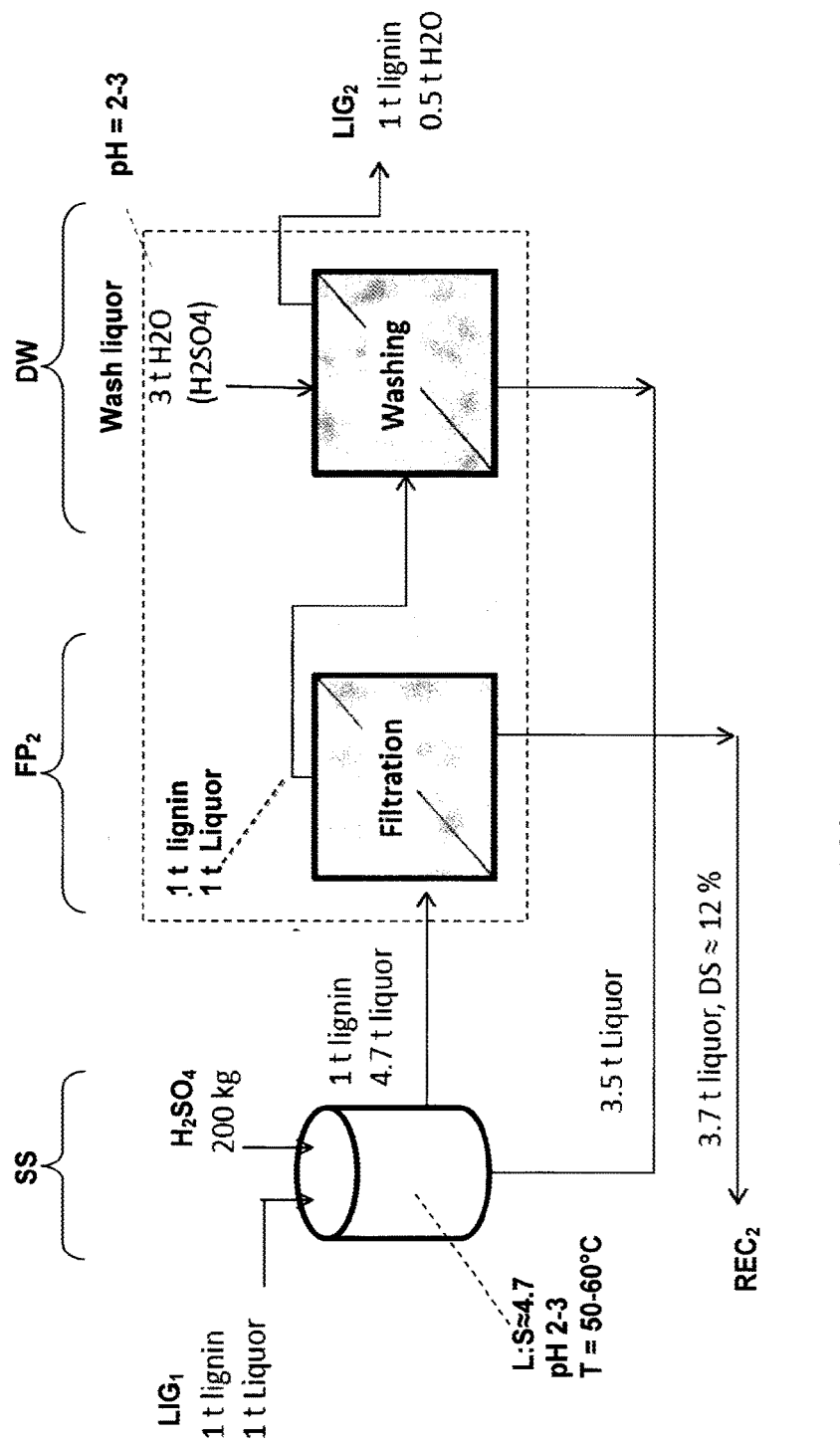
FIG. 2 shows the liquid balance established in last two stages when using a process shown in FIG. 1.

As a starting point for the invention was the Ligno-Boost™ process used, which is shown in principle in FIGS. 1 and 2.

In FIG. 1 is the process according to WO 2006/031175 shown. The separation of lignin from original black liquor $BL_{IN}$ comprising the following stages in sequence:

Precipitation of lignin by a first acidification stage PR of the original black liquor $BL_{IN}$ by adding a first acid or mixture of acids $AC_1$, in any suitable precipitation reactor, followed by dewatering while forming a first filter cake $LIG_1$ with high content of lignin, said dewatering made in any suitable filter press $FP_1$, which may drain a first filtrate $REC_1$ from the lignin suspension. In order to reduce the amount of liquid in the filter cake $LIG_1$ gas may be blown trough the lignin cake in order to displace any residual black liquor (not shown), and subsequently suspending the first lignin filter cake $LIG_1$ in a second acidification stage SS using a second acid or mixture of acids $AC_2$, said suspension made in any suitable suspension tank. In this tank a second lignin suspension is obtained.

The second lignin suspension is thereafter sent to a dewatering and washing stage $FP_2$ & DW forming a second filter-/lignin cake $LIG_2$ with high content of lignin. Said dewatering made in any suitable filter press $FP_2$, which may drain a second filtrate $REC_2$ from the lignin suspension, and at least a portion of this second filtrate $REC_2$ may be re-circulated back to the suspension stage. Washing of the second filter cake is made in any suitable wash apparatus DW, adding a wash liquid W to this washing stage.

In view of the objective to obtain a purified lignin product having low residual levels of metal, especially sodium, while consuming less acidifiers and hence produce less volume of acidic waste flow volumes, and at low costs for acidifiers, some process conditions have been found best suitable. It has been found that carbon dioxide is the preferred first acidifier $AC_1$ as carbon dioxide may be found in waste gases in a pulp mill. Hence, using carbon dioxide in waste gases solves both a waste gas problem as well as decrease of external chemicals. The conditions in the first precipitation stage is kept at a pH in the range 9-10, i.e. still alkaline, which results in that the bulk volume of black liquor $BL_{IN}$ treated in the precipitation stage is kept in the filtrate $REC_1$ and may thus be reintroduced to the recovery operations without inflicting any dramatic pH changes in the recovery process. The relatively small volume share of the lignin cake $LIG_1$ is the only volume needing further acidification for leaching of metals from the lignin, which means that the volumes of the second acidifier $AC_2$ is low in relation to original black liquor volumes. In order to obtain sufficient leaching of metals the leaching process has been kept at operating conditions at pH 2-4 at 50-60° C. A lignin product could be produced at these conditions with very low residual content of sodium, thus suitable as a fuel in combustion plants.

FIG. 2 shows the liquid balance established in last two stages when using a process shown in FIG. 1. Here is the $FP_2$ & DW stage shown as separated stages. The first lignin filter cake $LIG_1$ is acidified using sulfuric acid, i.e. $H_2SO_4$.

In FIG. 3 is shown the organic composition of the lignin cake obtained by using a process according to FIG. 2, when treating an original black liquor obtained form a Soda-AQ cooking process with so called Lo-Solids cooking circulations during the cook. Lo-Solids implies that black liquor is withdrawn in several positions during the cook and replaced with cooking liquor with low content of Dissolved Organic Material, i.e. DOM. This result in that both lignin and carbohydrates, i.e. hemicelluloses, is withdrawn from cook and ends up in the black liquor. As shown in the 3 lignin samples BL3, BL3 and BL2 obtained is the carbohydrate content as high as between 10.1 to 11.2%. The relative composition of carbohydrates is shown in lower part of the table and as much as 85.5 to 86.5% of the carbohydrates consist of Xylose.

Figure 4:
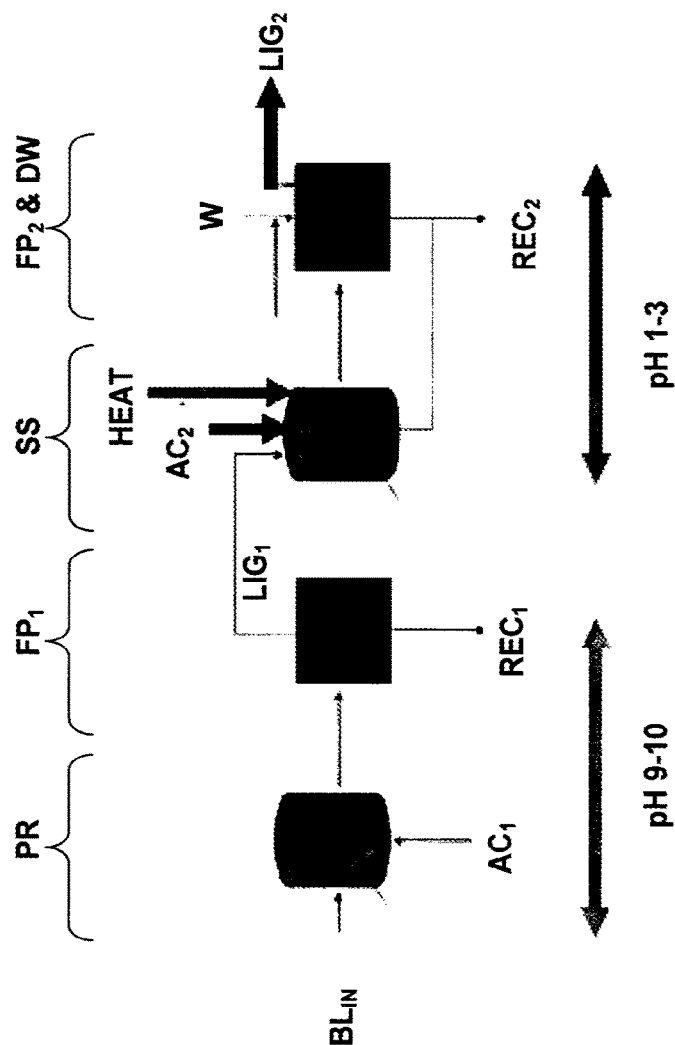
FIG. 4 shows a principle modification of the process shown in FIG. 1 establishing a first alternative for the inventive method.
Figure 5:
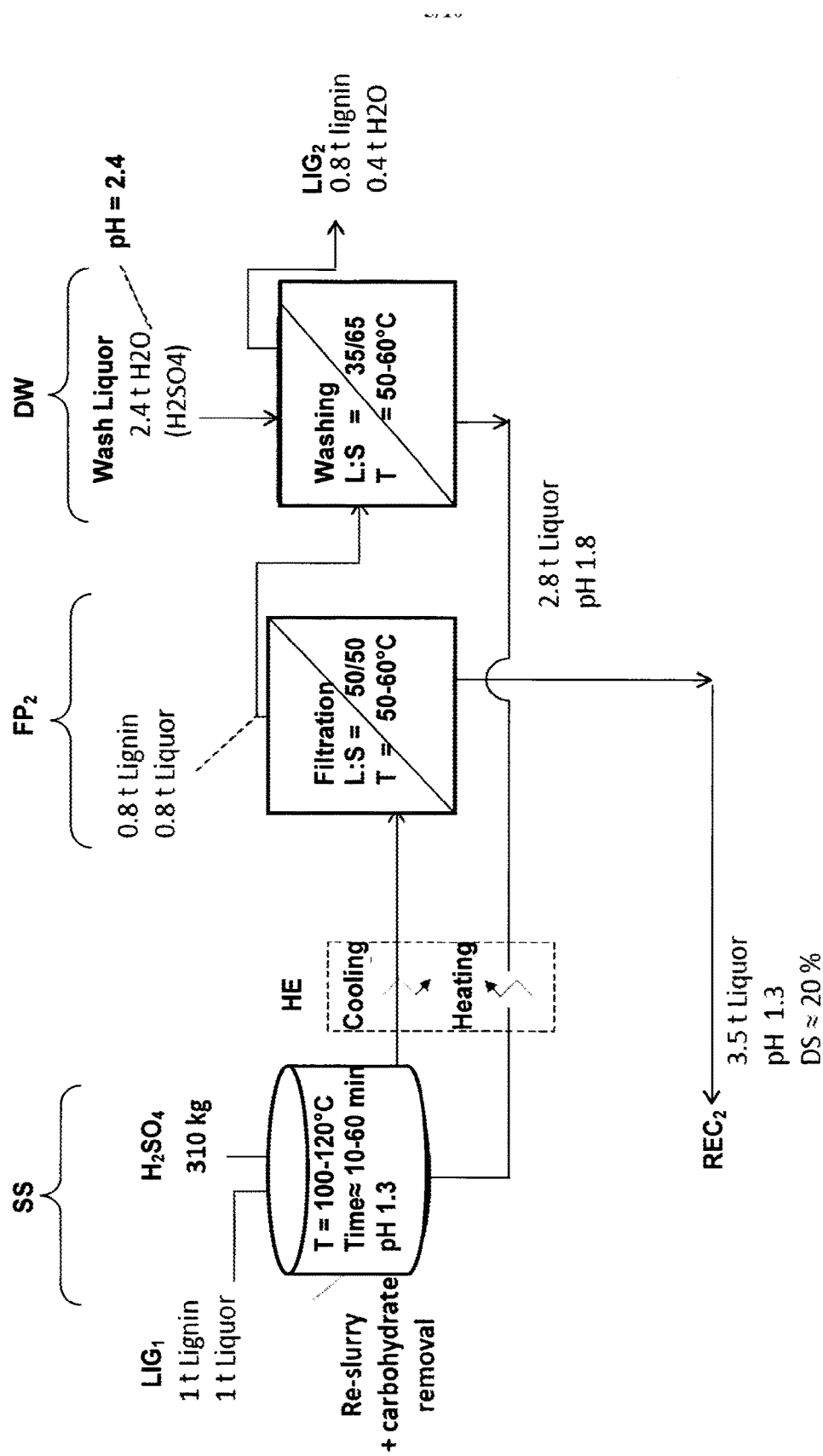
FIG. 5 shows the liquid balance established in last two stages when using a process as shown in FIG. 4.

In FIG. 4 is shown a first preferred embodiment of the inventive method. The new method steps as compared with the previous process shown in FIGS. 1 and 2 is the intensified acidification of the lignin cake $LIG_1$ and moderate heating of the acidified and re-slurried lignin cake $LIG_1$ in the second acidification stage SS using a second acid or mixture of acids $AC_2$. The advantage with this embodiment is that no additional equipment is needed in comparison to the previous process as shown in FIG. 1, besides additional heating and addition of more acidifier. FIG. 5 shows the liquid balance established in last two stages when using the first preferred embodiment of the inventive method shown in FIG. 4. In comparison with the liquid balance as disclosed in FIG. 2, is the amount of added sulfuric acid increased from 200 kg up to 390 kg per ton of lignin produced, i.e. an increase of about 95%. The charge of fresh sulfuric acid is 310 kg obtaining 0,8 t of lignin, which results in a relative charge of 310/0.8=387 kg per ton of lignin produced. As a result of the moderately intensified conditions in the second acidification stage is almost all of the carbohydrate content broken down to soluble monomers. As could be seen in this first preferred embodiment is the only additional equipment needed an heat exchanger HE and a somewhat larger pressurized vessel for the re-suspending and hydrolysis stage, but at some larger charge of acidifiers.

Figure 6:
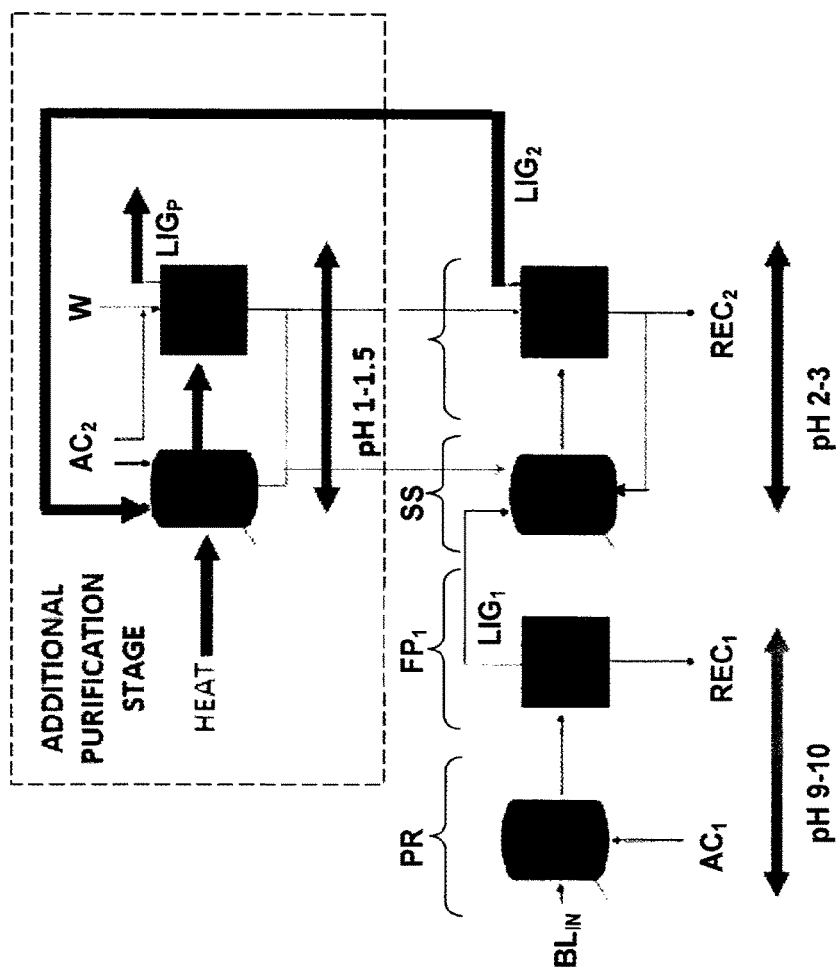
FIG. 6 shows a principle modification of the process shown in FIG. 1 establishing a second alternative for the inventive method;.
Figure 7:
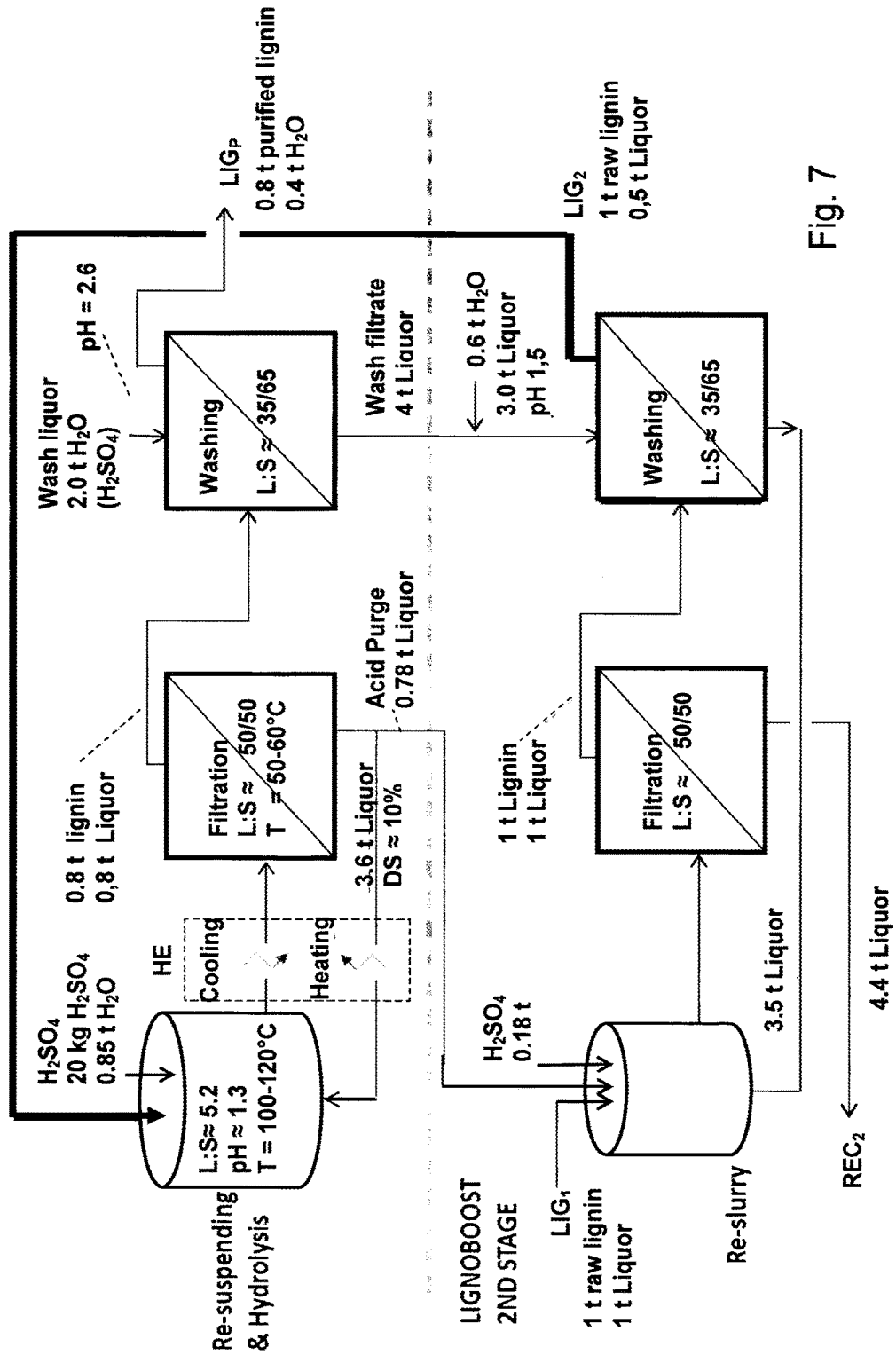
FIG. 7 shows the liquid balance established in last two stages when using a process as shown in FIG. 6.

In FIG. 6 is shown a second preferred embodiment of the inventive method. In contrast to the first embodiment shown in FIG. 4 is the carbohydrates removed in an additional purification stage added after the process as shown in FIGS. 1 and 2. FIG. 7 shows the liquid balance established when using as additional purification stage according to the second preferred embodiment of the inventive method shown in FIG. 6. In comparison with the liquid balance as disclosed in FIG. 2, is the amount of added sulfuric acid per ton of lignin precipitated increased from 200 kg from FIG. 2 up to 250 kg, i.e. a modest increase of about 25%. The charge of fresh sulfuric acid is made by adding only 20 kg to the resuspending stage while 180 kg fresh sulfuric acid is added to re-slurry stage (as about 20 kg is contained in Acid purge flow which results in same total charge of 200 kg in this position as in FIG. 2) obtaining 0.8 t of lignin, which results in a relative charge of 200/0.8=250 kg per ton of lignin produced. The reasons for the modest increase of acidifier is that the intensified acidification to a pH of about 1.3 in last re-suspending and hydrolysis, compared to a pH of about 2-3 in preceding stages, is that a large part of the acidic filtrate is returned from a subsequent filtration stage, i.e. about 3.6 t liquor, while 0.78 t of the filtrate, i.e. more than 20% of the filtrate, from the filtration is purged from the stage and sent to first re-slurry stage. Hence, the addition of fresh acidifier should replace the amount purged from the stage. A result of the moderately intensified conditions in the second acidification stage is that almost all of the carbohydrates are broken down to soluble monomers. As could be seen in this second preferred embodiment is the required additional charge of acidifiers reduced considerably but instead is additional equipment needed in form of additional pressurized vessel for the re-suspending and hydrolysis stage and following filtration and washing stages with associated piping.

The first preferred embodiment results in reduced investment costs, if this is the primary objective, and the second preferred embodiment results in reduced operating costs as the charge of acidifiers is reduced considerably, and the second preferred embodiment is justified if available space is at hand at the mill for the extra equipment and the pay-off time is acceptable (cost for chemicals VS investment costs).

Carbohydrate Removal Experiments

Carbohydrate removal was tested in laboratory using a 0.5 liter mechanically stirred reactor using lignin obtained from black liquor. 10-15 g of the dry lignin suspended in 200 ml liquid was used in each test. The conditions for the carbohydrate hydrolysis tested was in the temperature range 80-120° C., at reaction time 10-60 minutes and at an established acidity of 0.5-4% $H_2SO_4$.

After the hydrolysis was the solid product carbohydrate content analyzed using acid hydrolytic method (HPAEC+PAD detection of sugars). The dissolved lignin content in the filtrate was analyzed with UV analysis.

Figure 9:
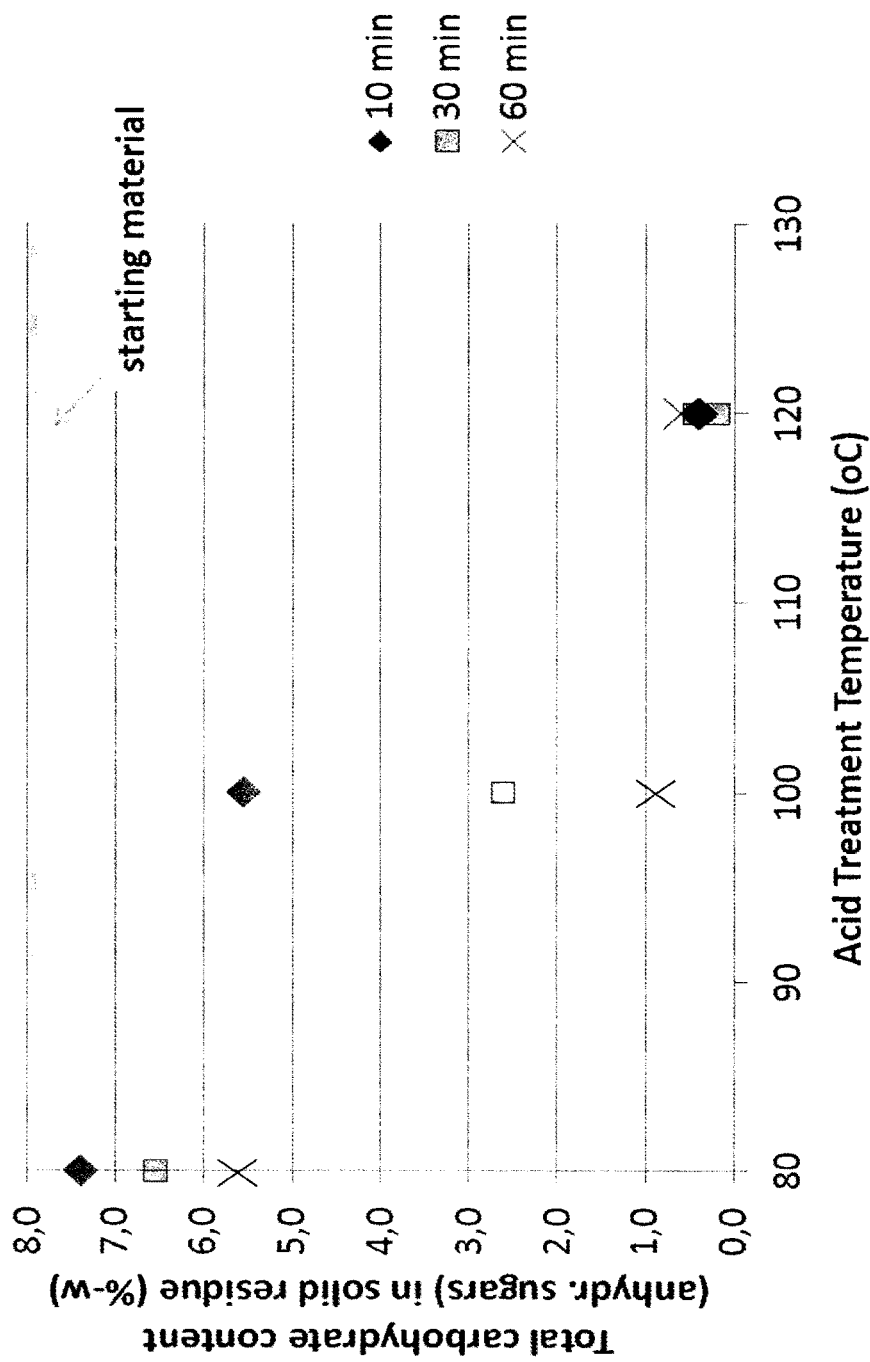
FIG. 9 shows the residual carbohydrate content as a function of time and temperature.

The constitution of the starting lignin material was as indicated in FIG. 8. and several experiments were done, and results are plotted in FIG. 9. What could be seen here is that all tests done at a hydrolysis temperature of 120° C. all achieved a residual level of carbohydrates under 1 wt-%.

One test done at 100° C. and at retention time of 60 minutes achieved a residual level of carbohydrates under 1 wt-%. It is thus clear that the minimum P-factor for achieving a carbohydrate content below 1 wt-% corresponds to this test point. Using the P-factor as defined by H.Sixta this lower operating point corresponds to a P-factor of about 1. And the tests have done at 120° C. indicate that there is not much to be gained by increasing the retention time more than 10 minutes at 120° C. Using the P-factor as defined by H.Sixta this upper operating point corresponds to a P-factor of about 8 if retention time is 60 minutes.

Thus, it is clear that a reasonable upper limit of the P-factor corresponds to this point, as increase of retention time to 30 and 60 minutes would not decrease carbohydrate content in any major regard and further increase of P-factor would likely induce losses in lignin yield.

Figure 10:
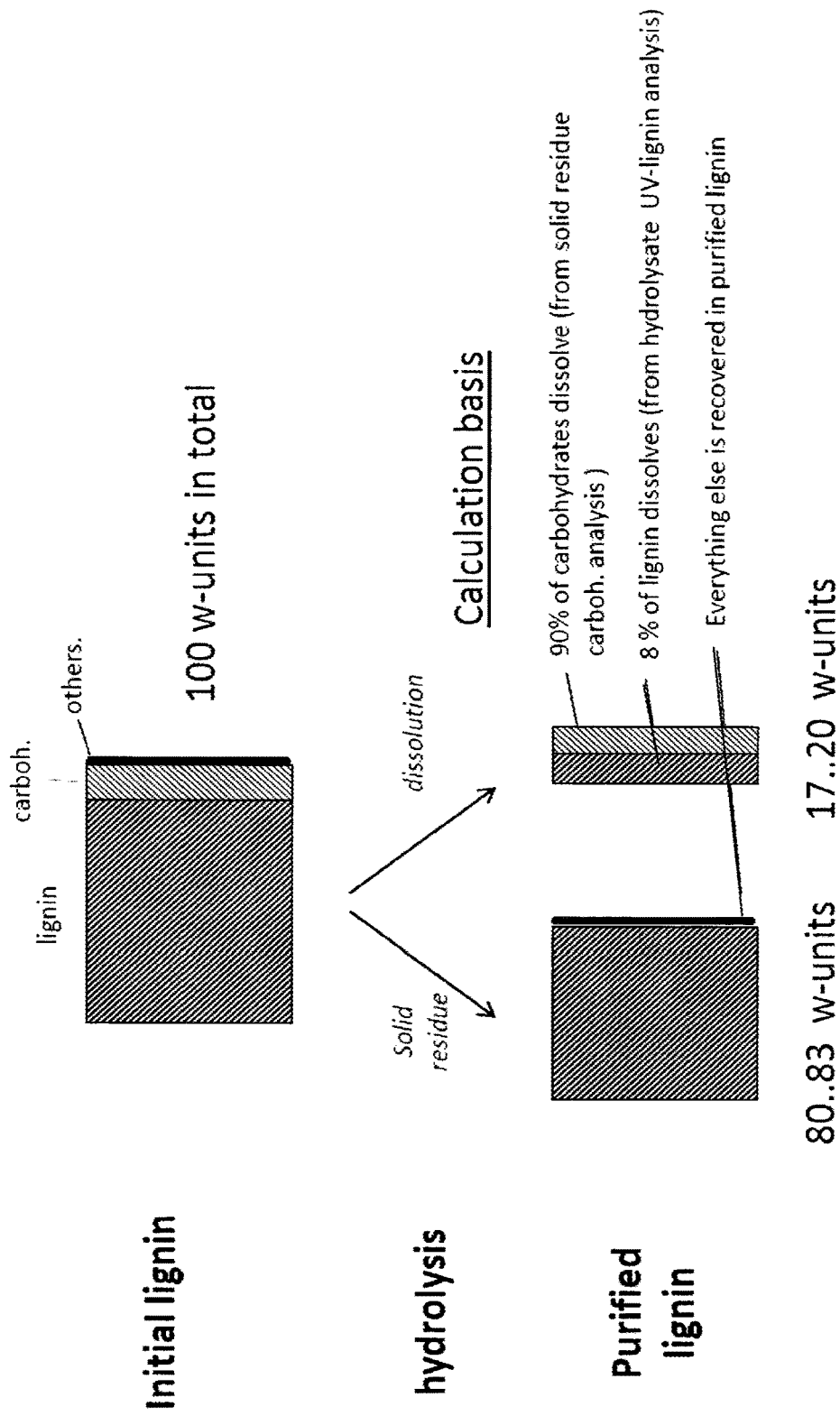
FIG. 10 shows how the hydrolysis results in purified lignin fraction and another fraction dissolved in the hydrolysis liquid.

The final result of the carbohydrate removal is shown in principle in FIG. 10. As shown in this figure is some 17-20 wt-% of the initial lignin lost as dissolved carbohydrates and dissolved lignin in roughly about 50/50 proportions. As about 8% of the lignin content is dissolved roughly 9-12% of the initial lignin content of carbohydrates is dissolved amounting to more than 90% of the total carbohydrate content. The purified lignin after the hydrolysis is then sufficiently clean for other purposes where residual carbohydrate content must be below 1-wt %, and the lignin fraction of the initial lignin suffers a yield loss below 10%. The test examples were all conducted at a charge of $H_2SO_4$ of 1.0 wt-%, which was found to be sufficient in order to establish a pH level of about 1.3 in the hydrolysis stage.

Possible Modifications

Other acidifiers than $H_2SO_4$ may be used, but sulfuric acid is preferred as sulfur is a common chemical component in black liquor in kraft pulping. However, there may be a need for purging sulfur in order to keep the sodium/sulfur balance of the mill. Using HCl as an alternative acidifier is often not preferred as it will introduce chlorides into the chemical cycle of the mill.

One very important aspect of the present invention as an improvement of the Lignoboost™ process (as discussed above) is the cooling step after the sugar removal at the elevated temperatures. In general, the Lignoboost™ process includes a two-stage pH lowering process and has a unique ability to control lignin solubility during washing since large gradients between the applied wash water and the solid lignin is avoided. In the past, it was extremely difficult to wash the precipitate in the prior art one-step pH lowering processes because the precipitate was extremely fine (almost colloidal). This together with a large pH and ionic strength gradient led to the inability to control solubility during the washing process and tendency of the precipitate to clog up the filters. To summarize the Lignoboost™ process, the first precipitation step is often done with carbon dioxide which is a mild neutralization and the pH drops to about pH 10. This makes the lignin into light flaky precipitation that is later washed. The first precipitation is re-slurried before exposure to strong acidic conditions in a second precipitation stage that brings down the pH to about 1-3 to enable an ion exchange. The resulting slurry is filtrated and washed again to remove residuals, ash etc.

In the present invention, the improved LignoBoost™ process, a short polysaccharide hydrolysis step at elevated temperature and a subsequent rapid cooling step are assembled between the above described first and second filtering steps. Only by this means can the carbohydrate (oligosaccharide) residue, that is chemically connected to lignin molecules, be removed. In contrast, the original LignoBoost™ two-stage process removes all soluble and ionic non-lignin material. As a result, an ultra-pure lignin is obtained. The important features in these two extra steps, i.e. the fast reaction and rapid cooling, is the efficiency of the execution of the steps. Lignin is a thermoplastic material and any extra exposure to heat leads to coalescence of the lignin particles and formation of a tar-like substance which cannot be satisfactorily filtered by any means. Therefore, the hydrolyzing step is carried out fast at 120-140° C. and in 10-30 minutes. Then a rapid cooling step to, for example, about 40-60° C. is carried out in approximately 10 seconds to 1 minute. Quite contrary to earlier knowledge of the plasticization of lignin, it has now been discovered that rapid cooling keeps the lignin particles intact and maintains good filterability in the second filtering and washing stage of the LignoBoost™ process which also washes away the reaction products from the hydrolyzing step. The important cooling step is thus carried out between the two precipitation stages.

More particularly, the acidic slurry is kept at the reaction temperature until at least 60% of the carbohydrates is hydrolyzed. This rapid cooling step takes place before the next or subsequent separation or filtering step of the treated lignin. It has been surprisingly discovered that the rapid cooling step directly after the hydrolysis reduces lignin degradation and keeps the lignin yield high. The filterability of the precipitated lignin after first having been exposed to reaction temperatures as high as 130-140° C. was not expected. When lignin is heated to about 100-110° C. it starts to behave like a thermoplastic material and the particles tend to melt or stick to together that make it very difficult to filter. A melt cannot be filtered properly. However, by keeping the heating process short followed by rapid cooling the good filterability of the lignin can be maintained.

The rapid cooling may be accomplished by, for example, using an indirect heat exchanger against an acidifier to heat it and use it as the second acidifier. The temperature of the acidic slurry should be reduced by at least 40° C. from the reaction temperature of between 100-140° C. Preferably, the temperature should be reduced by at least 60° C. to a temperature range of 40-80° C. prior to the second separation/filter stage. More preferably, the temperature of the slurry should be reduced by at least 80° C. to a temperature of about 40-60° C. prior to the second filtering step. Most preferably, the temperature should be between about 50-60° C.

The cooling time should be rapid. The acidic slurry should be cooled to the cooling temperature in 10 seconds to 2 minutes, more preferably between 10 seconds and 1 minute and most preferably in 20-40 seconds to ensure a good yield and to prevent the lignin from becoming too tacky.

Because lignin is a thermoplastic material, it is technically difficult to carry out slurry filtering and washing at temperatures that exceed 60° C. In general, if the 60° C. temperature is exceeded, there is a high risk that the filtering properties of this kind of special lignin precipitate may collapse and the subsequent filtering and washing becomes very difficult if not impossible.

It was surprisingly discovered that lignin can be treated at temperatures as high as 100-140° C. without losing yield and without making the lignin tacky (which makes the slurry difficult to filter in the subsequent filtering step). More preferably, the temperature should be in the range of 120-140° C. and most preferably in the range of 135-140° C.

Another feature is that a short reaction time should be used. The reaction time may be in the range of 10-60 minutes. More preferably, the range should be between 10-50 minutes and most preferably between 10-30 minutes that results in a P-factor of less than 20.

In other words, it was unexpectedly discovered that the combination of the shorter reaction time and the rapid cooling step of the acidic slurry enables the use of small cost-effective reactors. Another advantage is that it avoids the lengthy exposure of lignin to pre-hydrolysis conditions. This avoidance improves the lignin yield. More particularly, any further degradation of the lignin is stopped by using the active cooling step right before the second separation stage starts.

While the present invention has been described in accordance with preferred compositions and embodiments, it is to be understood that certain substitutions and alterations may be made thereto without departing from the spirit and scope of the following claims.

I claim:

1. A method for separation of lignin from original black liquor ($BL_{IN}$) having a first alkaline pH value, comprising the following stages in sequence:

in a first precipitation stage (PR), adding an acidifier charge to an original black liquor in order to decrease a pH value of the original black liquor to a second pH level initiating precipitation of lignin so that the second pH level is above a pH value of 7 and below 11.5, in a subsequent first separation stage ($FP_1$), separating a precipitated lignin as a lignin cake ($LIG_1$) with a content of carbohydrates from a remaining liquid phase of the original black liquor still kept in a pH range from neutral to alkaline, mixing a lignin from the lignin cake with a content of carbohydrates in a subsequent stage with a second acidifier added to the lignin cake forming an acidic slurry establishing a pH value in a range of 1-3, establishing a reaction temperature in a range of 100-140° C. in the acidic slurry, maintaining the acidic slurry at the reaction temperature for a reaction time period during which at least 60% of the content of carbohydrates is hydrolyzed, the reaction time period being in a range of 10-30 minutes resulting in a P-factor of less than 20, rapidly cooling the acidic slurry to reduce a temperature of the acidic slurry in 10 seconds to 2 minutes to a temperature in a range of 40-60° C., and in a subsequent second separation stage, separating a treated and cooled lignin content from the acidic slurry and carbohydrates dissolved in the acidic slurry forming a low carbohydrate lignin cake.

2. A method according to claim 1 wherein the reaction temperature in the acidic slurry is in a range of 135-140° C.

3. A method according to claim 1 wherein after the acidic slurry is rapidly cooled to a cooling temperature of 50-60° C.

4. A method according to claim 3 wherein the acidic slurry is cooled to the cooling temperature in 10 seconds to 1 minute.

5. A method according to claim 4 wherein the acidic slurry is cooled to the cooling temperature in 20-40 seconds.

\* \* \* \* \*